United States Patent [19]

Calori

[11] 4,140,454
[45] Feb. 20, 1979

[54] MOLDING APPARATUS FOR INJECTION MOLDING A VEHICLE

[75] Inventor: Giovanni Calori, Milan, Italy

[73] Assignee: Industrie Pirelli, S.p.A., Milan, Italy

[21] Appl. No.: 877,475

[22] Filed: Feb. 13, 1978

Related U.S. Application Data

[62] Division of Ser. No. 689,850, May 25, 1976, Pat. No. 4,106,888.

[30] Foreign Application Priority Data

Jun. 13, 1975 [IT] Italy .............................. 24326 A/75

[51] Int. Cl.² .......................... B29H 5/02; B29F 1/00
[52] U.S. Cl. ................................ 425/190; 425/36;
425/56; 425/47; 425/542; 425/577; 425/589
[58] Field of Search .................... 425/32, 35, 36, 39, 425/40, 45, 46, 47, 49, 54, 55, 56, 57, 58, 542, 577, 589

[56] References Cited

U.S. PATENT DOCUMENTS

| 868,732 | 10/1907 | Vincent | 425/35 |
|---|---|---|---|
| 1,101,732 | 6/1914 | Doughty | 425/40 |
| 1,179,898 | 4/1916 | Coffey et al. | 425/47 |
| 1,223,726 | 4/1917 | Overman | 425/46 |
| 1,388,255 | 8/1921 | Hardeman | 425/35 |
| 1,411,588 | 4/1922 | Schultz | 425/36 |
| 1,420,488 | 6/1922 | Koennecke et al. | 425/56 X |
| 1,455,218 | 5/1923 | Merriman | 425/36 |
| 1,982,674 | 12/1934 | Laursen | 425/58 |
| 2,763,317 | 9/1956 | Ostling et al. | 425/52 X |
| 3,358,330 | 12/1967 | Pacciarini et al. | 425/39 |
| 3,459,849 | 8/1969 | DeRonde | 425/45 X |
| 3,924,982 | 12/1975 | Xavg et al. | 425/52 X |
| 4,006,053 | 2/1977 | Goodfellow | 425/32 X |
| 4,059,375 | 11/1977 | Koch et al. | 425/32 X |

FOREIGN PATENT DOCUMENTS

22217 of 1909 United Kingdom ...................... 425/35

Primary Examiner—J. Howard Flint, Jr.
Attorney, Agent, or Firm—Stevens, Davis, Miller & Mosher

[57] ABSTRACT

A mold is provided for injection molding a vehicle tire such as the one disclosed in U.S. Pat. No. 3,805,868 having a bead of elastomeric material. The mold has an outer envelope and an inner body member having a core formed of radially collapsible sectors which combine to enclose a mold cavity. The inner body member has at least two annular elements, an upper and lower one, which are separable from one another and from the core along the direction of the core axis. The annular elements have surfaces which form axially inner surfaces of the tire's beads. The inner body member is also provided with members for blocking the annular elements with the core and with the envelope. The core of the mold is divided into two series of alternate collapsible sectors which are displaced radially inwardly when the tire is released from the mold. Apparatus is provided for actuating the mold parts to disassemble and assemble the mold.

17 Claims, 16 Drawing Figures

MOLDING APPARATUS FOR INJECTION MOLDING A VEHICLE

This is a division of application Ser. No. 689,850 filed May 25, 1976, now U.S. Pat. No. 4,106,888.

The present invention relates to a mold for pneumatic tires, to the operation of the mold for making a tire and to apparatus for actuation of the mold parts. In particular, the invention concerns the manufacture of tires having beads made essentially of plastomeric or elastomeric material.

In order to reduce the expenses deriving from the manufacture of conventional vehicle tires, by processes which involve many manual working steps, attempts have been made to develop a process for making tires by injection molding processes on rigid mold cores.

Generally, the molds suitable for injection processes have an outer envelope and an inner rigid core associated together in such a way as to create a free space or mold cavity into which the plastomeric or elastomeric material is introduced under high pressure to originate the desired shape of the tire. The core comprises a plurality of radially displaceable sectors, at least one of which, called "key" sector, must be displaced first to allow the removal of the other sectors from between the beads of the already formed tire.

Unfortunately, the molds heretofore known are unsuitable for tires having an inner structure which includes undercuts, for instance, when the tire sidewalls are substantially concave or convex towards the inside.

It is evident that in such cases the use of a conventional core would require the application of substantial forces on the individual sectors, since the removal of the latter would be strongly contrasted by the shape of the sidewalls. Therefore, it can be understood that the application of high forces would be required during the relative displacement of some sectors with respect to others and in the zones of mutual contact, a "pinching" of the elastomeric material, with consequent tears and cuts prejudicial to the tire structure.

Moreover, the application of high forces, transmitted by the sectors to the sidewalls, would tend to move the whole tire during the shifting of the sectors, so that the mold would be unduly complicated, for instance, with the addition of further elements intended to retain the tread from the outside.

In particular, the molds used up to this time have proven unsuitable for molding a pneumatic tire of the type described in Italian Patent No. 928,502 and U.S. Pat. No. 3,805,868. Such a tire has a tread which is of greater width than the width of any other part of the tire, an annular reinforcing structure arranged below the tread, two sidewalls strongly convex towards the inside, and two beads made substantially of elastomeric material. It is clear that, in molding a tire of this type, the adoption of high forces for the removal of the sectors from a conventional core would subject the sidewalls to excessive stress, in particular in proximity of the reinforcing structure. In fact, in that case, owing to the different rigidity between the part of elastomer reinforced with the structure and the contiguous part, serious drawbacks might take place.

Accordingly, a molding apparatus is provided for manufacturing a tire with tread, sidewalls and beads, the beads being made essentially of a plastomeric or elastomeric material, the mold comprising an outer envelope and an inner body associated together to provide a mold cavity corresponding to te desired shape of the tire, the inner body comprising a core made of radially displaceable sectors, characterized in that the inner body comprises at least two annular elements, an upper one and a lower one, which are separable from one another and from the core along the direction of the core axis, the elements having at least two surfaces forming axially inner surfaces of the beads of the tire to be manufactured, the inner body comprising, moreover, means for blocking the annular elements with the core and with the outer envelope during the tire molding.

The above indicated mold is used advantageously, in particular, for manufacturing by injection molding a pneumatic tire having sidewalls which are substantially convex towards the inside of the type disclosed in the aforesaid Italian patent.

In fact, the inner body of the above described mold comprises two annular elements which, having defined the profile of the beads in the tire manufacture, permit the sidewalls to spread out subsequently when they are moved away from each other, thus facilitating the radial collapse of the sectors.

Further advantages of the mold are afforded by the presence of the above cited blocking means.

In fact, the blocking means to join the inner body to the sectors and to the envelope during injection permit maintenance of the space intended to be filled with the plastomeric or elastomeric material unchanged so that the tire will have exactly the desired shape.

In a preferred embodiment, the inner body comprises the core and only two annular elements of equal shape arranged symmetrically with respect to the mid-plane of the mold coincident with the equatorial plane of the already formed tire.

Still in the preferred embodiment, the blocking means between the annular elements and the sectors comprise recesses and protuberances for mutual engagement, and the blocking means between the annular elements and the envelope comprise, for each annular element, a frusto-conical surface, whose smaller base lies on the equatorial plane of the mold. The frusto-conical surface is intended to be coupled with a corresponding frusto-conical surface of the envelope.

The above embodiment is advantageous since it ensures and guarantees with simple joint connections a perfect centering and union of the various parts of the mold.

The mold has other features which permit its simple and easy handling. Therefore, a mold is provided as described above, characterized in that it comprises parts of the annular elements which are able to apply forces for varying the distance between the annular elements along the direction of the core axis, and in that the sectors comprise radial prolongation members extending as far as the space around the core axis beyond the radially innermost surfaces of the annular elements.

A still further object of the invention is to provide an apparatus for carrying out a method for dissassembling and reassembling a mold for the manufacture of vehicle tires, In particular, the applicant has devised an apparatus able, through appropriate means, to handle a mold as described.

Accordingly, a still further object of the invention is to provide a handling apparatus for a tire manufacturing mold, the mold comprising an outer envelope and an inner core associated to originate the desired shape of the tire, the inner body comprising a core formed of radially decomposable sectors and at least two annular elements, an upper one and a lower one, separable from one another and from the core along the direction of the core axis, the elements having at least two surfaces forming axially inner surfaces of the beads of the tire to be manufactured, the apparatus being characterized in that it comprises an upper frame and a fixed lower frame provided with a mold-handling plane, the frames having their central vertical axes aligned to each other to constitute the central vertical axis of the apparatus, first means associated with the frames and intended to apply forces to the annular elements to vary their distance along the direction of the core axis, the first means associated with the upper frame being further intended to support the inner body of the mold, the apparatus being moreover characterized in that it comprises second means associated with the lower frame and intended to support and block the sectors of the mold core on the handling plane, to displace the sectors radially, and to displace at least a part of the sectors along the direction of the core axis as far as a distance from the handling plane such as to allow the maximum radial collapse of the remaining sectors.

Preferably, the apparatus is characterized in that the upper frame can be moved horizontally.

The first means comprise cylindrical rods intended to engage the annular elements, the rods associated to the upper frame being provided with a first and a second tooth, arranged in two differently oriented planes passing through the rod axis, the first tooth being provided for engaging in a groove of the upper annular element, the second tooth being provided for engaging in a first groove of the lower annular element, the rods associated with the lower frame being provided with a tooth provided for engaging in a second groove of the lower annular element, the apparatus further comprising two sleeves, each having an inner diameter equal to the radially outermost diameter of the tire beads protruding from the inner body of the mold, the sleeves, respectively associated to the upper and to the lower frame, being arranged coaxial to the two annular elements, with one end into contact with the tire sidewalls in proximity of the beads, when the inner body of the mold with the tire is associated with the apparatus.

In the above cited embodiment the rods, through the engagement of the respective teeth in the grooves of the annular elements permit variation in the mutual distance of the elements and therefore to spread out the sidewalls of the tire situated in the inner body of the mold.

As the upper rods are associated to an upper frame which in the preferred embodiment is movable, and since they have teeth able to engage with grooves of the lower annular element, they permit support and transport of the inner body of the mold, together with the relative tire, to an appropriate handling area.

The further characteristics of the first means consist in two sleeves so arranged as to block the tire beads when the annular elements are moved away from one another.

This feature ensures advantageously the correct spreading out of the tire sidewalls, since the action exerted by the sleeves permits avoidance of any unforeseen and undesired disengagement of the beads from the relative seats of the annular elements.

In the preferred embodiment of the first means, the apparatus is characterized in that it comprises, together with the upper cylindrical rods and the lower cylindrical rods, a support of annular shape and a control apparatus associated to the lower and the upper frame to approach or detach mutually the rods along the direction of the central vertical axis of the apparatus and to detach the sleeves having one end in contact with the tire, from the inner body of the mold, the support having at least an external lateral surface of such a shape as to be able to fit exactly inside the upper annular element as far as a depth not concerning the opening of the grooves of the upper annular element and at least a surface in the form of a circle ring to provide an abutting surface with respect to the surface of the upper annular element which is the farthest from the equatorial plane of the mold, the support being connected with the control apparatus associated to the upper frame and being arranged coaxial to the central vertical axis of the apparatus, the upper rods being inserted, for a portion of their length, in the thickness of the annular support in a direction parallel to the central axis of the apparatus, free to rotate about their own axis and protruding with their teeth below the support, the lower rods being connected at one end with the control apparatus associated to the lower frame, free to rotate about their own axis, inserted for a portion of their length in the thickness of the handling plane along a direction parallel to the central vertical axis of the apparatus, and protruding with their teeth above the handling plane, the upper and the lower rods being aligned with one another and being arranged in a symmetrical position with respect to the central vertical axis of the apparatus, the lower rods being provided with a point having the form of a prismatic geometric solid, and the upper rods being provided with a point having a notch of a form corresponding to that of the solid in order to ensure a coupling between the upper and the lower rods, as well as a rotation common about their own axis, one sleeve being connected to the control apparatus associated to the upper frame and the other to that associated with the lower frame.

In their turn, the second means comprise slides, guides for the slides, connections between the slides and sectors of the mold core to associate the slides with the sectors when the inner body of the mold is above the handling plane, the slides being in a number equal to that of the sectors, the guides being arranged radially about the central vertical axis of the apparatus and on a plane parallel to the handling plane, and a mechanism for displacing radially the slides with the sectors, the mechanism comprising moreover engaging means for displacing at least a part of the sectors in the direction of the core axis as far as a distance from the handling plane which permits the maximum radial collapse of the remaining sectors of the mold.

The connections join the slides with appropriate radial prolongation members on the sectors and the radially innermost parts of the prolongations protrude from the slides.

In the preferred embodiment, the connections comprise a cylindrical small shaft connected to each slide, a through hole in each prolongation of the sectors, the hole having a diameter corresponding to the diameter of the small shaft, the small shafts extending in a direction parallel to the core axis and above the handling plane, and the small shafts being insertable in the holes of the prolongation members when the inner body of the mold is above the handling plane.

The engaging means for the actuation mechanism comprise a thrust surface arranged at the center of the apparatus in a plane below the prolongation members of the sectors, the thrust surface, when the slides associated to the sectors to be displaced along the direction of the core axis are collapsed at the center of the apparatus, being able to abut against the lower surface of the radially innermost part of the prolongation members which protrudes from the slides in order to displace the corresponding sectors along the small shafts.

The operation of the apparatus is substantially the following: after having removed the outer envelope of the mold, the upper frame is moved, for instance on a track, as far as to bring it at the zone where the mold is situated.

The annular support of the upper frame is lowered by centering it inside the upper annular element, and then the upper rods are rotated with respect to their own axis in such a way that their teeth are inserted in the grooves of the lower annular element.

With this operation, the inner body of the mold is associated to the upper frame, which therefore can be raised again, moved and brought to the lower frame.

When the upper frame and the lower frame are centered with respect to each other, the inner body of the mold is laid on the handling plane of the lower frame in such a way that the small shafts of the slides are inserted in the holes of the prolongation members of the sectors and the points of the lower rods are encased in the notches of the points of the upper rods. In this way any possible rotation imparted to the upper rods is transmitted to the correspondingly aligned lower rods.

At this moment, the handling of the mold is carried out by means of the following operations: The upper rods, and consequently the lower rods are rotated in such a manner that the teeth of the upper rods are engaged only in the grooves of the upper annular element and the teeth of the lower rods are engaged in the grooves of the lower annular element and the control apparatus is actuated, originating the moving away of the annular elements and the consequent spreading out of the tire sidewalls. During this movement, the presence of the two sleeves, upper one and lower one, situated around the radially outermost part of the beads and having one end on the sidewalls in proximity of the beads, ensures a perfect spreading out of the sidewalls.

Then, by means of the actuation mechanism, it is acted on the slides, compelling at least a part of the sectors to displace radially as far as to go above a thrust surface, which originates their displacement along the small shafts. Immediately afterwards, also the other sectors are caused to collapse radially in the space left free by the sectors previously displaced.

In the subsequent steps, the lower sleeve is actuated to originate the disengagement of the lower bead; then it is again acted to advance the upper annular element so as to drag the tire upward. During this step, the tire is moved upward without being hindered by the sectors, which are already collapsed.

At least, it is again acted by means of the control apparatus on the upper sleeve, moving it away from the upper annular element to obtain the disengagement of the second bead. The apparatus is stopped when the tire dragged by the upper annular element is completely removed from it by virtue of a force opposite to the direction of its motion.

The reassembling of the mold is carried out in a manner substantially analogous to that described above.

In particular, at first the sectors are reassembled by means of operations inverse with respect to those already explained, and then it is acted to approach and position the annular elements on the core.

Subsequently, by means of the upper frame, the inner body of the mold is supported with the upper rods and is positioned in the envelope.

The apparatus according to the present invention may comprise further means able to apply the annular reinforcing structure of a tire about the inner body of the mold.

Preferably, this means comprises circular segments and a pneumatic control for each segment, each segment comprising a circular flange parallel to the extreme handling plane and able to support the annular reinforcing structure, the pneumatic control comprising a cylinder with the relative piston, the cylinder being applied above the extreme handling plane with its axis parallel to the plane and the relative piston slidable inside the cylinder in radial direction, the piston being connected to a segment.

The function of the segments and of the relative flanges is that of supporting the annular reinforcing structure in a step preceding the reassembling of the core. Subsequently, the supporting action is carried out by the sectors, when these are caused to expand to rebuild the core. In fact, during this step, the sectors are brought with their outer surfaces towards the inner surface of the annular reinforcing structure and exert on the latter such radial forces as to anchor it permanently to the core and to allow the backward motion of the segments by means of the radial movement of the pistons to which they are associated. In these conditions, the inner body of the mold is prepared for the manufacture of a new tire.

It can be easily noted from what is said above with respect to the embodiment of the apparatus and of the explanation of its operation, that systems of mechanical articulations between the annular elements and the sectors are quite lacking; also, the simple maneuver of the whole apparatus, which effects only movements along the core axis or movements in a plane perpendicular to the axis, is quite evident.

It is therefore clear that the apparatus, having parts not connected together by complicate mechanical systems, affords the advantage of being easily accessible in view of maintenance and checking operations.

Moreover, the cited simplicity of maneuver permits advantageously the automation of the whole apparatus, which can be effected by appropriately planning the sequence of intervention of the control apparatus for the displacement of the annular elements, of the sleeves and of the actuation mechanism for the displacement of the sectors.

The present invention will now be further explained with reference to the attached drawings, made by way of example only, and concerning the mold and its handling apparatus.

Figure 1:
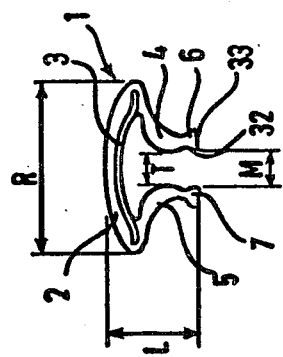
FIG. 1 is a diagrammatic representation of the cross-section of the tire to which the invention is particularly directed.

A pneumatic tire 1 of the type to which the invention is particularly applicable is illustrated in FIG. 1. This tire has a tread 2, an annular reinforcing structure 3, two sidewalls 4 and 5 and two beads 6 and 7, made substantially of elastomeric material. As is clearly visible in FIG. 1, the tire has a tread 2 having a greater width than that of any other part of the tire, and sidewalls having a convex shape which is considerably accentuated towards the inside. Therefore, this is a tire of a new type having an inner profile, which because it requires an appropriate shape of the inner body of the mold, has created the problem of providing a new system for disassembling the mold in order to overcome the obstacle, represented by the shape of the sidewalls, to the removal of the mold core.

The mold 8 (FIG. 2) comprises an outer envelope or body 9 and an inner body 10 associated together in such a way that a hollow space is created of a shape which when filled with plastomeric or elastomeric material will determine the desired shape of the tire.

The outer envelope has two planes, namely an upper plane 11 and a lower plane 12, and several segment-shaped pieces 13 which combine with inner body members 10 to enclose the mold cavity. The plastomeric or elastomeric material necessary for the tire molding is injected through appropriate channels, not illustrated because they are not a part of the present invention. In general, and only by way of example, the channels may convey the molding material through openings disposed adjacent to the outer surface of the tread and of the beads in such a way that the moldable material may reach from opposite sides the annular reinforcing structure 3, which has already been arranged in the mold cavity.

The inner body member 10 has a core 14 (FIGS. 2, 4 and 5) of the type constituted by radially collapsible sectors, with four "key" sectors 15, 16, 17, 18 (FIG. 5) and four intermediate sectors 19, 20, 21, 22 which combine to form a ring. Two annular elements, an upper one 23 and a lower one 24 are disposed on opposite sides of the ring (see FIGS. 2—4).

The "key" sectors are those which, according to a known principle, are to be radially collapsed first in order to allow the radial collapse of the remaining sectors 19, 20, 21, 22.

Figure 2:
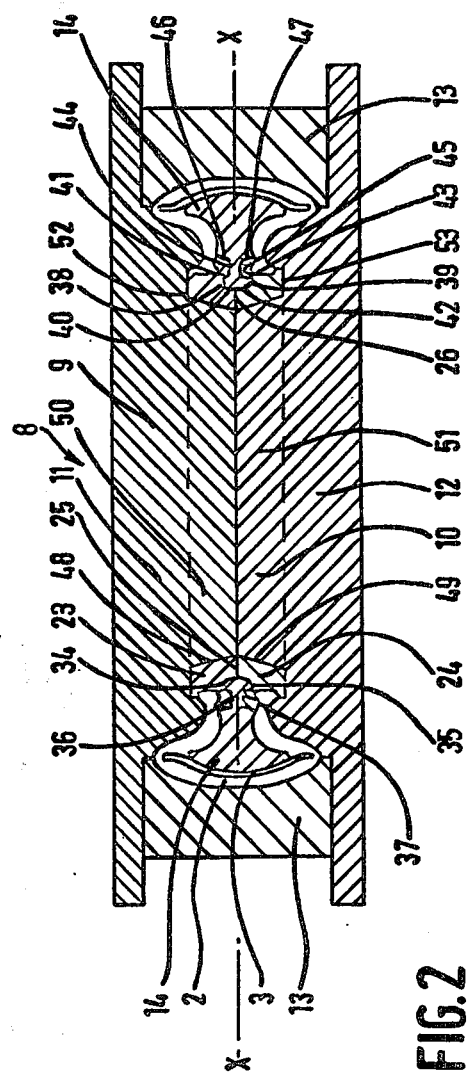
FIG. 2 is a cross-section of one embodiment of a mold which may be used in practicing the invention.

The annular elements 23, 24 equal and are symmetrical with respect to the midplane of the mold defined by axis x—x of FIG. 2 and coincident with the equatorial plane of the tire, are in mutual contact along the base surfaces 25 and 26 of the sectors.

The core 14 and the two annular elements 23 and 24 cooperate in determining the tire profile during molding and, to this end, each sector of the core comprises surfaces 27, 28, 29 (FIG. 4), which correspond respectively to circumferential surfaces of the inner portion of the tread and of the sidewalls of the tire.

On their turn, the annular elements are provided with circular seats or grooves 30 and 31 (FIG. 4), having surfaces which correspond to the tire surfaces disposed between the inner zone 32 connecting the sidewalls to the beads, and a part 33 of the axially outer zone of the beads (FIG. 1).

The union between the various parts of the mold is ensured by the presence of joint connections in order to guarantee that, during molding, the core is firmly connected to the annular elements and these to the outer envelope. These connections are obtained by providing the two annular elements with recesses 34, 35 and protuberant member 36, 37, respectively.

Figure 3:
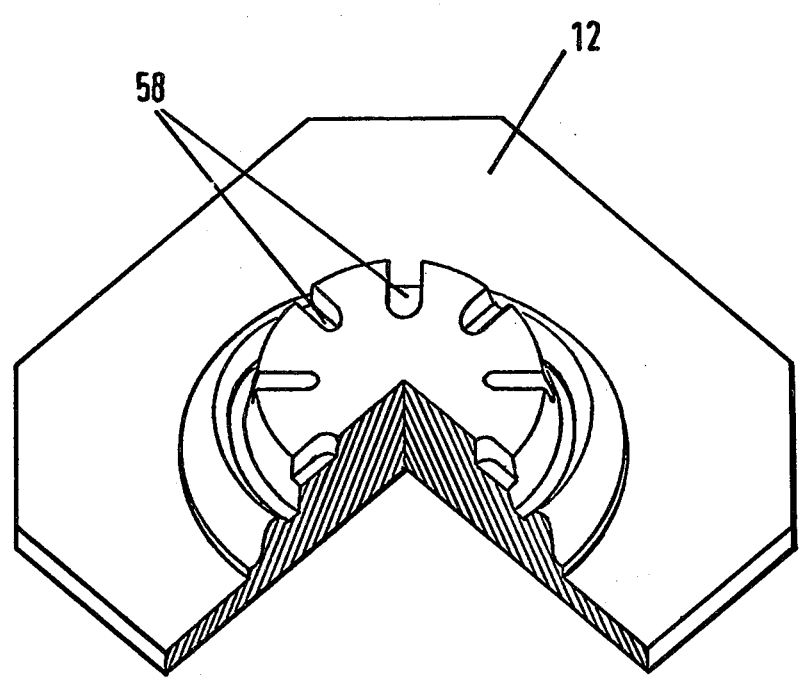
FIG. 3 is a perspective view partially cut-away of a part of a mold envelope.
Figure 4:
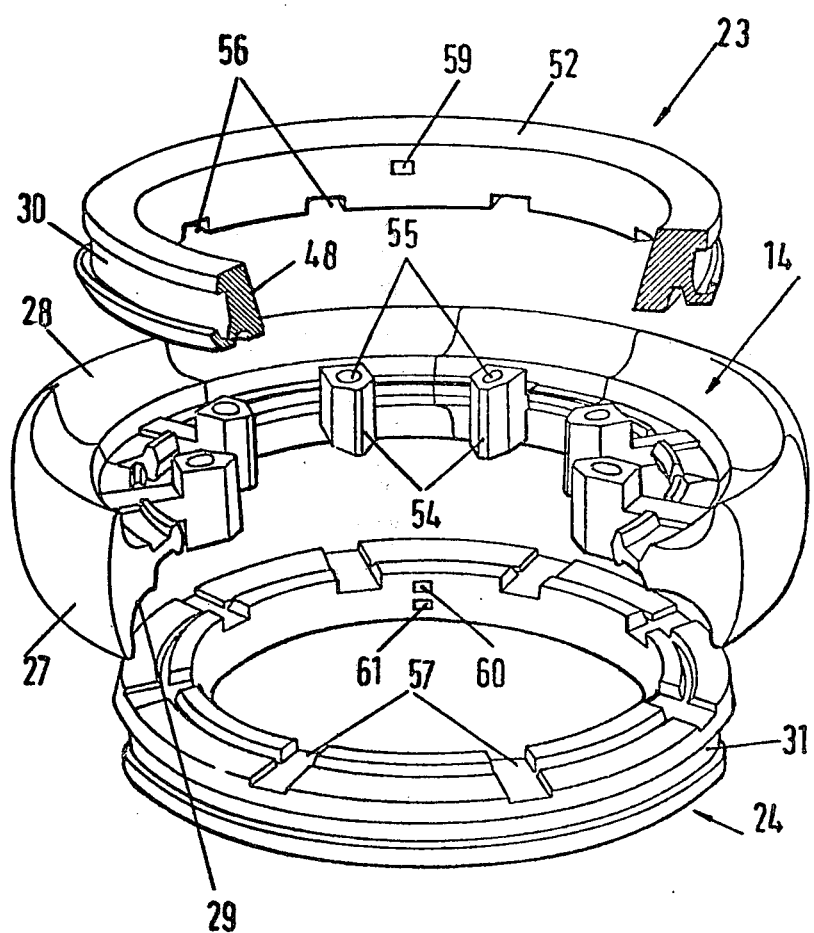
FIG. 4 is an exploded perspective view of the various parts of the inner body of the mold.
Figure 5:
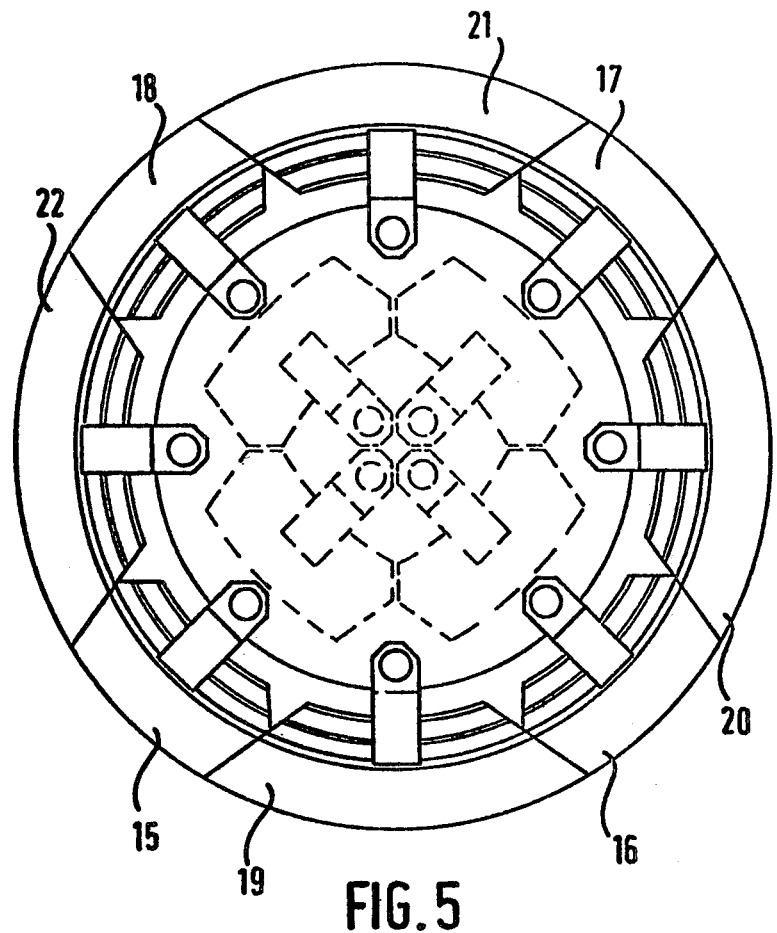
FIG. 5 is a top view of the core sectors.

In the embodiment illustrated in FIGS. 2–4, the recesses 34 and 35 have bottoms 38, 39, respectively, parallel to the equatorial plane of the mold and limited in their height between oblique walls 40, 41, 42, 43 and the protuberances have bottoms 44, 45, respectively, parallel to the equatorial plane of the mold between oblique walls 41, 46 and 43, 47.

The connection of the whole inner body of the mold with respect to the envelope 9 is obtained by shaping the inner walls of the annular elements 23 and 24 with frusto-conical surfaces 48 and 49, whose smaller base coincides with the equatorial plane of the mold, in such a way as to receive equal parts 50 and 51 of the envelope in abutment on the outer base surfaces 52 and 53 of the upper and of the lower annular element (FIG. 2).

After having described the mold parts intended to determine the tire profile, a description of the features which permit the disassembling of the mold by means of an appropriate apparatus is given.

These features include radial prolongations of the sectors and of grooves of the annular elements. These prolongation members 54 (FIG. 4) are directed towards the core center, and are provided, in proximity of their ends, with a through cylindrical hole 55, having an axis which is parallel to the core axis.

In the molding position, the members 54 are encased for a good part of their length in the radial grooves 56, 57 of the two annular elements 23 and 24, and have their ends disposed in the recesses 58 (FIG. 3) foreseen in the planes 11 and 12 of the envelope. There are four grooves 59 in the upper annular element 23 (FIG. 4) while there are four grooves 60 belonging to a first group and four grooves 61 belonging to a second group, underlying the first in lower annular member 24.

All the grooves 59, 60 and 61 have openings facing the space around the center of the core, and the grooves of the two annular elements 23 and 24 are aligned with one another and arranged symmetrically with respect to the core axis in two perpendicular planes passing through the core axis.

Moreover, the annular elements have preferably such an inner diameter as to be able to encase in their inside the "key" sectors for reasons which will be more clearly apparent in the description, made hereinbelow, of the mold handling.

After having described the mold, the apparatus which disassembles the mold for the removal of an already formed tire and reassembles the mold for preparing it to the manufacture of a new tire will be explained.

This apparatus (FIG. 6, 7) has a central vertical axis 62 and is divided into an upper frame 63 and a lower frame 64, arranged in an operating position, with their central vertical axes mutually aligned to form the central vertical axis 62.

The apparatus has first upper and lower means associated with the two frames and able to vary the distance between the annular elements 23, 24 along the direction of the core axis, second means associated to the lower frame, able to support and to displace the sectors of the core situated above an extreme handling plane 65 of the lower frame, and further means to apply around the inner body of the mold an annular reinforcing structure for a new tire to be manufactured.

Figure 6:
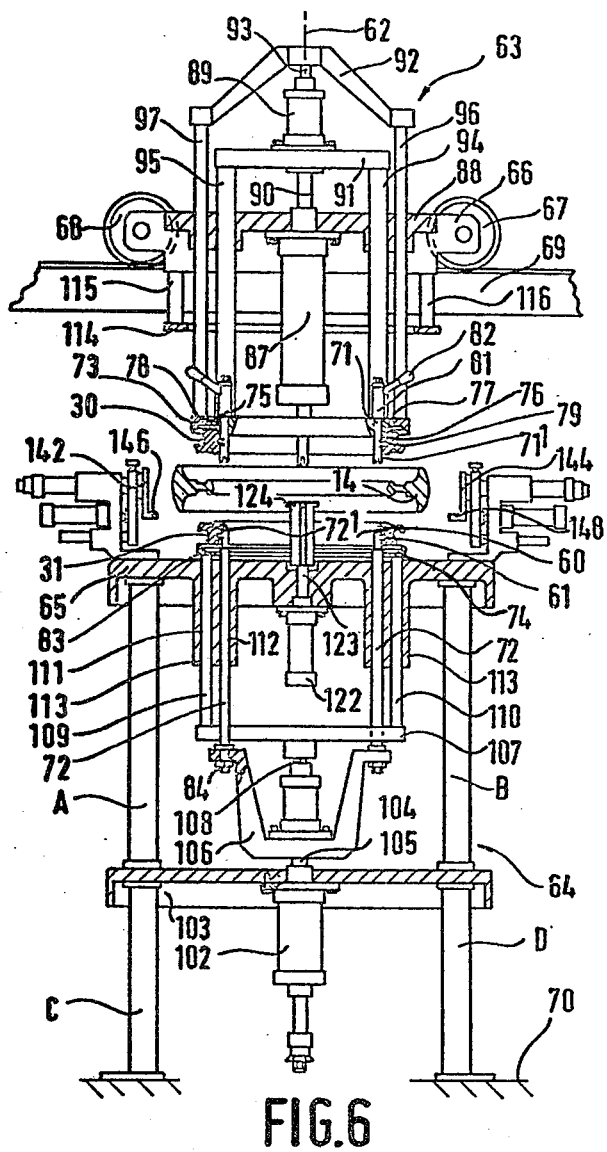
FIG. 6 is a front elevation, partially in section, showing some particulars of the mold handling apparatus without the means for collapsing and expanding the core sectors.

The upper frame is fast with a carriage 66 represented in FIG. 6, having wheels 67, 68 movable on a track 69 parallel to the horizontal plane of the floor 70. The handling plane 65 is parallel to the horizontal plane of the floor.

The first means comprise four upper cylindrical rods 71, four lower cylindrical rods 72, an upper sleeve 73, a lower sleeve 74, an annular support 75, an apparatus for the control of the sleeves and of the rods which comprises a first and a second elementary apparatus respectively associated to the upper and lower frame.

The support 75 has a frusto-conical surface 76 which can be exactly fitted in the corresponding frusto-conical surface 48 (FIGS. 2, 6, 7) of the upper annular element to a depth which does not concern the opening of the grooves, and a second surface 77 (FIGS. 6, 7), shaped as a circle ring, to provide an abutment with the base 52 (FIGS. 2, 6, 7) of the upper annular element 23.

The support further comprises a third frusto-conical lateral surface 78, the base of the cone being determined by the outermost circumference of the circle ring 77.

Each of the four rods 71 is associated to the support and protrudes below it with two teeth 79 and 80 (FIGS. 6, 7), arranged on two planes passing through the axis of the rod, for instance at 120° with respect to each other.

Figure 7:
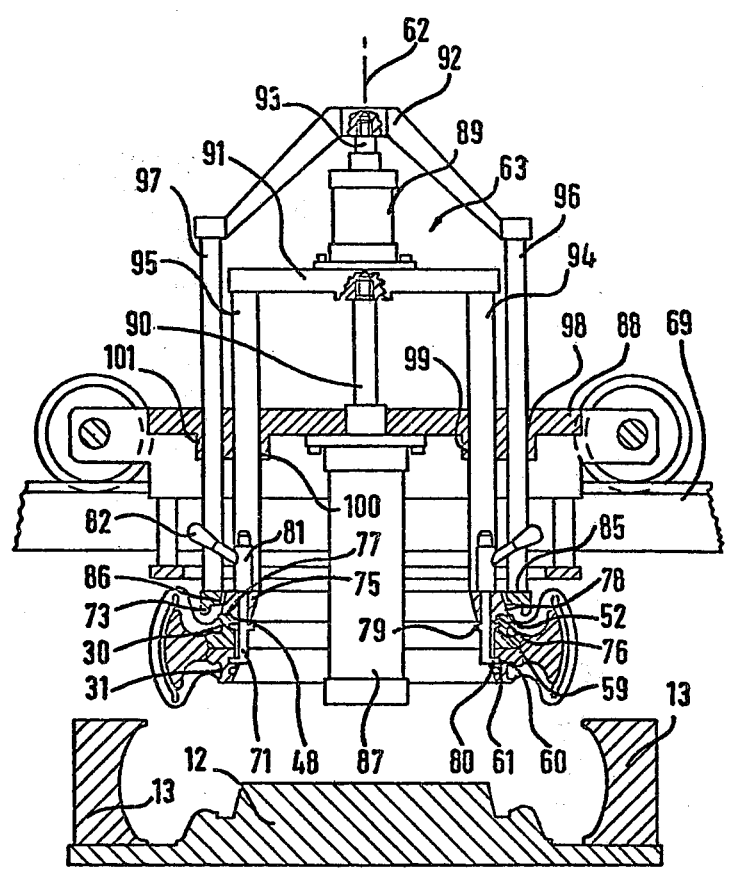
FIG. 7 represents the upper frame, partially in section, of the apparatus of FIG. 6 with the tire removed from the mold envelope.

The two teeth are spaced apart from each other by a value equal to the distance between a groove of the upper annular element and an underlying groove 60 of the first group of grooves of the lower annular element (FIGS. 4, 6, 7).

The upper part of the rods 71 is surrounded by, and is fast with, a cylindrical jacket 81 (FIGS. 6, 7, 10) provided with a handle 82 to allow the rotation of the rod about its own axis.

The upper rods are arranged in symmetrical position, with respect to the central axis of the apparatus, on two planes perpendicular to each other and passing through the central axis 62, and the radial distance between each rod and the central axis of the apparatus is equal to the radial distance between the core axis and the grooves.

Each of the lower rods 72 is associated with the lower frame and protrudes at one end with a tooth 83 above the extreme plane 65, while at the opposite end 84 it is connected to the control apparatus, as will be explained below.

The lower rods are situated in a symmetrical position with respect to the central vertical axis of the apparatus and are aligned with the upper rods in order to penetrate the one in the other. For this purpose, each lower rod 72 has a point 72' shaped as a prismatic geometric solid, and each upper rod has a point 71' provided with a notch, whose shape is corresponding to that of the geometric solid.

The sleeves 73, 74 have an inner diameter which is equal to the radially outermost diameter of the beads of the tire already formed in the mold, and are associated to the control apparatus in such a way that they are arranged coaxially to the central axis 62 of the apparatus and around the annular elements in order to block, as will be explained below, the tire beads against the seats 30 and 31 of the elements (FIGS. 4, 6, 7 and 11).

In particular, the sleeve 73 (FIG. 7) has a circular flange 85 with a lateral surface 86 which corresponds exactly to the frusto-conical surface 78 of the support, along which it is in contact.

The first elementary apparatus comprises a first oleo-dynamic cylinder 87 associated with a plate 88 (FIGS. 6, 7) of the upper frame, a second pneumatic cylinder 89 associated with the movement of the piston 90 of the first cylinder, a first and a second beam 91 and 92 arranged with their centers above the piston 90 and the piston 93 of the second cylinder 89, respectively.

The beam 91 is connected in turn to the support by means of two vertical columns 94, 95, and the beam 92 is connected to the sleeve by means of two additional vertical columns 96 and 97.

The columns are symmetrical with respect to the central vertical axis of the apparatus. The cylinders 87 and 89 are situated in the upper frame with their axes aligned with the central axis of the apparatus, and the columns are appropriately guided between cylindrical bushings 98, 99, 100, 101, obtained in the plate 88. The second elementary apparatus comprises a third cylinder 102 (FIG. 6) which is oleo-dynamic and is associated to a plate 103 situated between the vertical uprights of the lower frame (indicated with A, B, C, D in FIG. 6), a fourth pneumatic cylinder 104 associated with the movement of the piston 105 of the third cylinder 102, a third beam 106 above the third piston, a fourth beam, not visible in the FIG., situated at 90° with respect to the third and also having its center above the third piston 105, and a fifth beam 107 situated above the fourth piston 108 slidable in cylinder 104.

In their turn, the third and the fourth beam are associated to the ends 84 of the lower rods.

The connection between the lower rods and the beams is carried out in such a way that the lower rods may rotate about their own axis, as is clearly visible in FIG. 6.

The fifth beam 107 is connected in turn to the lower sleeve through two cylindrical columns 109, 110 passing through the thickness of the extreme plane 65 and arranged symmetrically with respect to the central vertical axis 62.

Both the columns 109, 110, and the lower rods are appropriately guided; more precisely, the first are guided along cylindrical bushings 111 and the second along four bushings 112 obtained in the thickness 113 of the extreme plane 65.

Up until now, the handling apparatus has been described with respect to the first means able to vary the distance between the annular elements through the teeth of the lower and upper rods engaged in the grooves.

To complete the part of the apparatus referred to the first means and to the relative movements, mention is made of a circular ring 114 (FIGS. 6, 7), situated in the upper frame and associated with the carriage 66 with bars 115 and 116.

This ring 114 is positioned with its axis aligned to the central axis 62 of the apparatus and has the task, explained below, to carry out, according to a certain operating sequence, the total disengagement of the tire from the inner body of the mold.

The second means of the apparatus able to support the core sectors on the handling plane 65 of the lower frame and intended to handle the core will now be described.

The second means, associated with part 64 of the lower frame, comprise for each sector (FIG. 9) a slide 117 provided with a small cylindrical shaft 118 extending in a direction parallel to the central axis of the apparatus and having a diameter corresponding to the inner diameter of the cylindrical hole 55 (FIG. 4) provided in the prolongation members 54 of each sector. The slides are constituted by a hollow cylinder 117' and by an arm 117" connected to each small shaft. For the sake of simplicity, the unit constituted by the hollow cylinder and the arm will be called slide.

The second means further comprise a guide 119 for each slide 117, an oleo-dynamic cylinder 120 with a piston 121 (FIGS. 9, 12) associated with each slide, a single oleo-dynamic cylinder 122 with a piston 123 provided with a thrust surface 124 (FIGS. 8, 9 and 12) intended to move the "key" sectors 15, 16, 17, 18 (FIGS. 5, 12, 13) along the direction of the core axis.

The small shafts 118 and the holes of the prolongation members 54 of each sector are provided to connect the sectors with the slides; therefore, when the inner body of the mold (see FIG. 9) is situated on the extreme plane 65 of the lower frame, each sector abuts on a supporting surface 125 associated to its own slide (FIGS. 9, 11, 12, 13) and coincident with the base of the small shaft.

Moreover, the small shafts connected with the "key" sectors have the further task of guiding the sectors 15, 16, 17, 18 during their displacement along the core axis.

To carry out the function, the hole 55 of each prolongation member 54 is obtained in such a position that it allows the radially innermost part 126 (FIGS. 9, 11, 12, 13) of the prolongation member to protrude from the supporting surface 125 of each slide, and the small shafts associated to the slides of the "key" sectors are extended in height to such a point as to allow the sectors to be displaced at a distance from the extreme plane suitable to permit the maximum radial collapse of the remaining sectors 19, 20, 21, 22.

Figure 12:
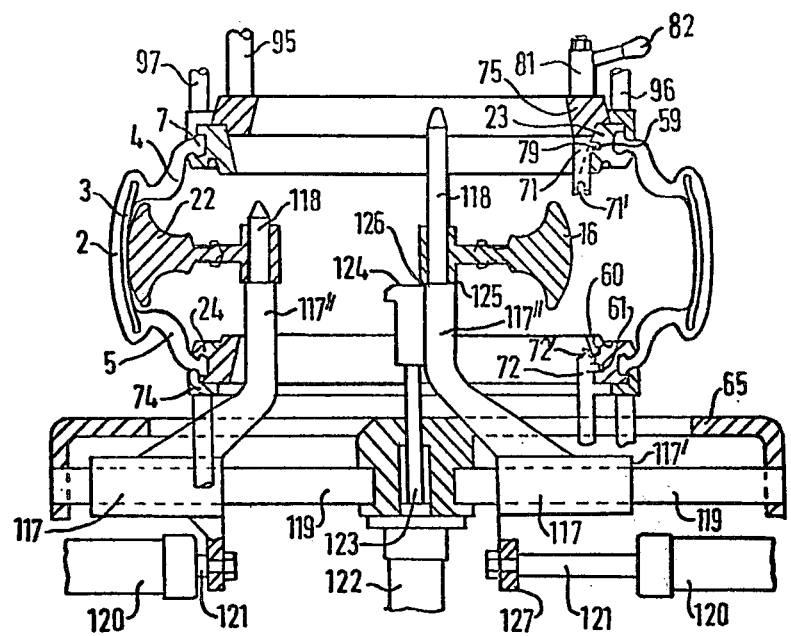
FIG. 12 represents diagrammatically in section the core with the tire supported by the slides.
Figure 13:
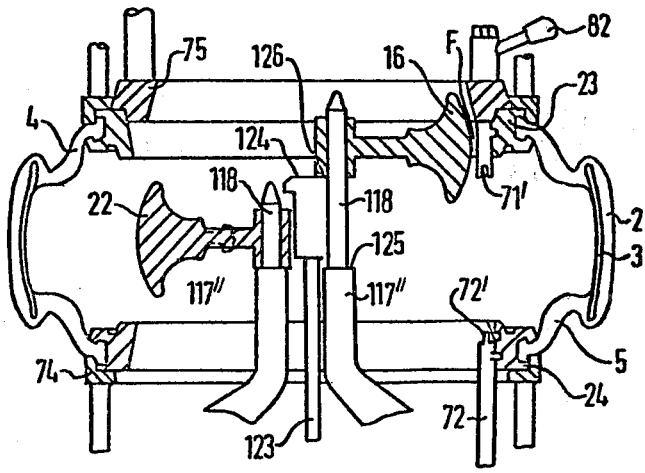
FIG. 13 represents the apparatus during the lifting of the already collapsed sectors and the radial collapse of the remaining sectors.

In particular, as regards the selection of the inner diameter of the upper annular element, the small shafts associated to the "key" sectors are extended in height in such a manner as to allow the sectors to be encased inside the upper annular element, in the position indicated herebelow, which will originate the maximum spreading out of the tire sidewalls (FIGS. 12, 13).

Figure 9:
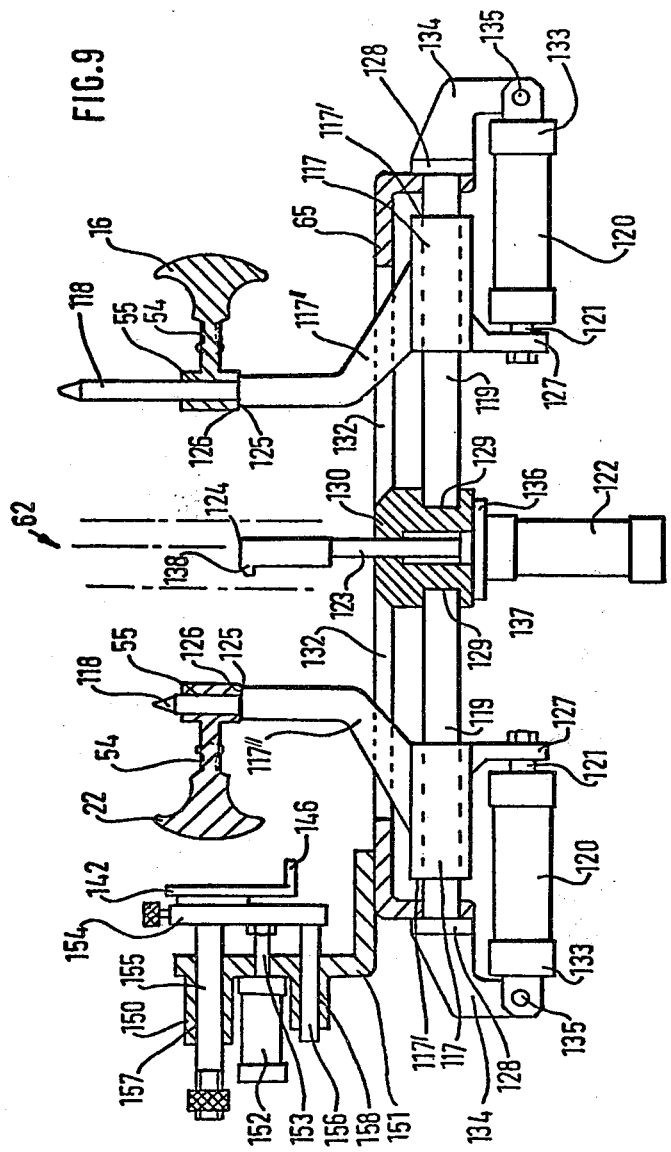
FIG. 9 represents the apparatus in a cross section taken along line IX—IX of FIG. 8, without the means for varying the distance between the two annular elements of the mold.

As regards the connections between the various parts of the second means, in FIG. 9 it can be seen that each slide 117 is connected to its own actuating piston 121 by means of an appendix 127 and that it is displaceable on its own guide 119, in its turn arranged parallel and below the extreme plane 65, between a point 128 of the lower frame and a groove 129 of a support 130 which is the central part of the extreme plane 65.

Figure 8:
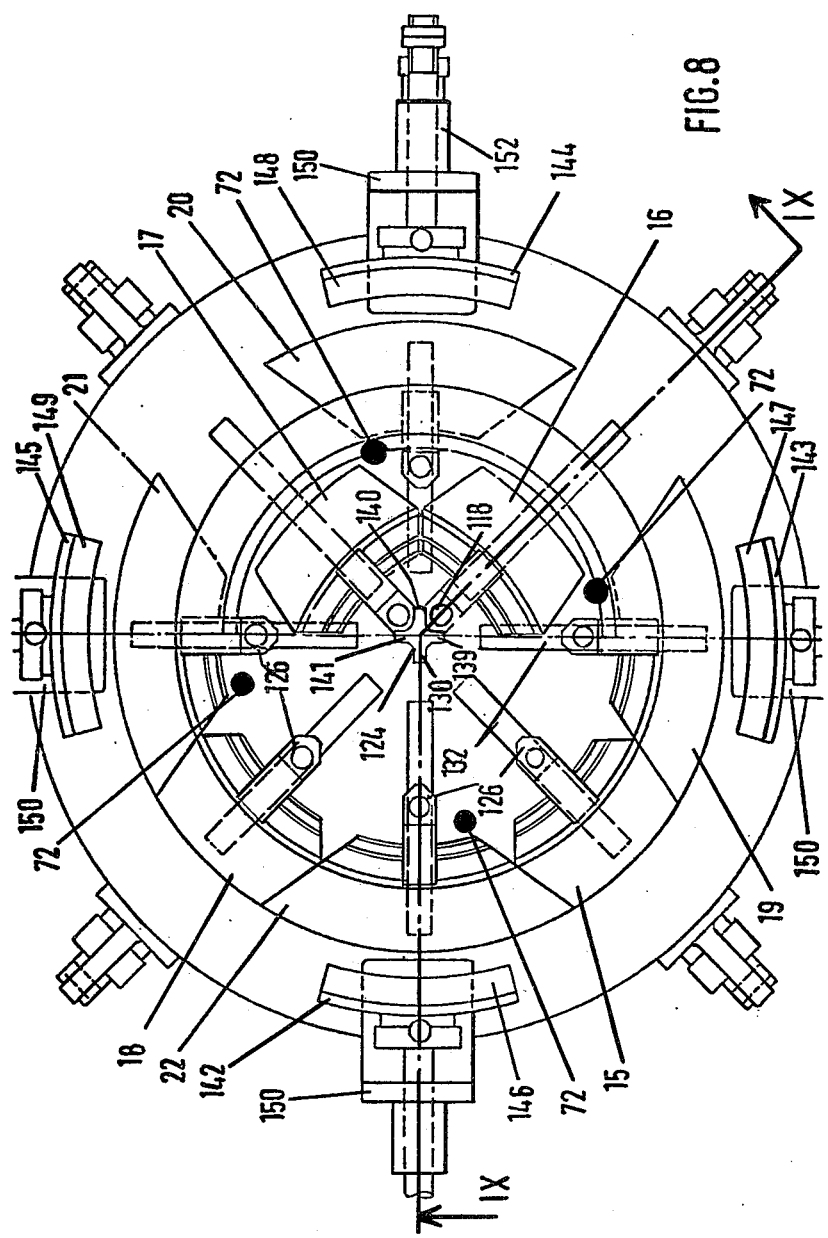
FIG. 8 is a top view, partially in section, of the lower frame of the apparatus of FIG. 6, with the means for collapsing and expanding the core sectors.

The small shafts 118 are situated above the handling plane 65 and the slides are guided, during their displacements, within radial grooves 132 (see FIG. 8). All the oleo-dynamic cylinders 120 (FIG. 9) are arranged in their turn below the guides and have their end 133, opposite to that from which protrude the relative pistons, connected to the lower frame at a point 134 through a hinge 135.

The further oleo-dynamic cylinder 122 is arranged with its axis aligned with the central axis of the apparatus and with its end 136 applied to the lower part 137 of the support 130.

The piston 123 of the cylinder, in its rest position, is protruding with its thrust surface 124 above the handling plane 65 and immediately below the plane which defines the radially innermost lower ends of each prolongation member.

The thrust surface has the function of exerting a lifting action on the "key" sectors 15, 16, 17, 18; to better carry out the function, it has four radial extensions 138, 139, 140, 141, intended two by two to push the lower part 126 of the prolongation member of each sector (see FIG. 8).

The above description refers to the apparatus, in particular to its parts necessary for the removal of the already formed tire.

As already explained, the apparatus is also able to reassemble the mold to prepare it for the manufacture of a new tire; therefore, to carry out this function, the apparatus comprises, besides the first and the second means, further means able to apply a reinforcing structure 3 for the tire (FIG. 1) about the core.

These further means are associated to the lower part 64 of the frame and comprise four circular segments (FIGS. 6, 8, 9) 142, 143, 144, 145, each provided with a circular flange 146, 147, 148, 149, parallel to the handling plane 65, to support the annular reinforcing structure. Each segment is associated to a pneumatic control 150 of its own (FIG. 9) comprising a basement 151 applied to the extreme plane 65.

The cylinder 152 is situated on the base, with its axis parallel to the handling plane 65 of the frame, and in such a way that the relative piston 153 moves in its stroke radially towards the center of the apparatus.

The piston is connected with a slab 154, appropriately guided, during the displacement of the piston 153, by guiding cylinders 155, 156, slidable into ducts 157, 158 having horizontal axis and obtained in the basement.

Each segment is moreover connected to the slab 154, at the desired distance from the handling plane 65 by means of an appropriate screw adjustment and the relative subsequent lockings.

To complete the description of the apparatus, it is pointed out hereinbelow that the oleo-dynamic and pneumatic actuations for the displacement both of the annular elements, and of the core sectors and the segments, have been indicated and illustrated in the drawing in a diagrammatic manner, without making reference to the pipes for sending fluid under pressure and the shut-off electrovalves.

As can be easily understood, the units for the control of the actuation fluid are of any known type, and the detailed description of the particulars has been omitted for the sake of simplicity, without prejudicing in any way the understanding of the objects of the invention.

A description will now be made of the operation of the apparatus, making reference at first to the phases for the removal of an already formed and cured tire and then to the phase for preparing the mold to the production of a new tire to be molded and cured.

The phases necessary to the disengagement of the tire from the mold are carried out as follows:

At first the plane 11 of the mold envelope is lifted and the segment-shaped pieces 13 (FIGS. 2, 7) are radially displaced on the lower plane 12. Then the upper frame 63 is shifted by moving the carriage 67 (FIG. 7) on the track 69 as far as the axis of the first and of the second upper cylinder 87, 89, are aligned with the core axis (FIG. 7).

In this position, for a determined arrangement of the upper frame 63 and of the mold, as well as for the orientation of the track, the two planes which define the position of the four upper rods are coincident with the two planes which define the position of the grooves in the annular elements.

Subsequently, fluid pressure is applied in the first upper cylinder 87 in such a way as to cause the sliding downward of the relative piston 90, and, with it, of the first and second beam 91 and 92, the guiding columns 94, 95, 96, 97 in the cylindrical bushings 98, 99, 100, 101, and consequently the support 75 and the sleeve 33, situated distant from the base 52 of the upper annular element.

The shifting of the first upper piston 90 terminates when the frusto-conical surface 76 of the support and that shaped as a circle ring 77 are, respectively, the one inserted in the corresponding inner frusto-conical surface 48 of the upper annular element 23, and the other in abutment on the base 52 of the same (FIG. 7).

After the shifting of the first piston 90 each upper rod 71 has one tooth disengaged from the grooves 59 of the upper annular element, and the other tooth 80 also disengaged from the grooves 60 of the first group of the lower annular element 24 (see FIG. 7).

At this moment, handles 82 of each upper rod 71 are actuated causing the insertion of the teeth 80 in the grooves 60 of the lower annular element; then fluid pressure is applied to the second upper cylinder 89 so as to cause the sliding downward of the relative piston 93 as far as to bring the lower edge of the sleeve 73 into contact with the zone of the upper sidewall, in proximity of the tire bead present around the inner body of the mold.

In these conditions the inner body of the mold is supported by the lower annular element 24 associated with the rods 71 to the upper frame 63, and therefore it is ready to be transported on the handling plane 65.

In a new step, the first upper cylinder 87 is actuated in such a way as to push the first piston 90 upward, so as to remove completely the inner body from the mold envelope.

Then, the carriage 60, 66 is activated by displacing the upper part of the frame parallel to the floor 70 (FIG. 6) as far as the axes of the first and of the second upper cylinder 87 and 89 are aligned with the axes of the third and fourth lower cylinder 102, 104 associated to the lower frame 64. In this condition of the apparatus, for a predetermined selection of the position of the upper frame 63 on the track, the four upper rods 71 associated with the upper support 75 are brought into alignment with the four lower rods 72 passing through the extreme handling plane 65.

With reference to the now described position, it is further acted by control means on the fluid of the first upper cylinder 87, so as to cause the latter to slide downward, thus approaching the inner body of the mold to the extreme plane 65. The stroke of the first upper piston 90 is stopped when the lower rods 72 insert their own point 72', having the shape of a prismatic geometric solid (FIG. 10), in the corresponding notches 71' provided in the points of the upper rods 71, and at the same time the small shafts 118 (FIG. 9) of the slides 117 are inserted in the corresponding holes 55 of the radial prolongation members 54 of each sector of the core (FIG. 11).

Therefore, after the displacement of the first upper piston 90, the core is supported above the handling plane 65 through the slides 117 (FIG. 9), and each upper rod is associated with a lower rod.

Moreover, the whole inner body of the mold is supported by the teeth 80 of the upper rods 71.

Figure 10:
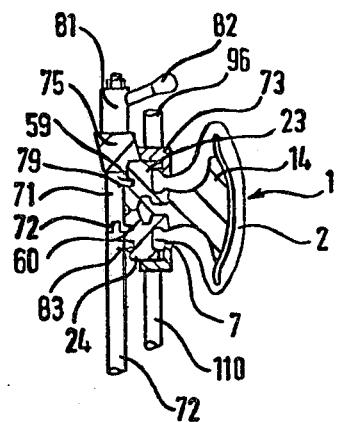
FIG. 10 represents diagrammatically the annular elements associated with the device before spreading out the tire sidewalls.
Figure 11:
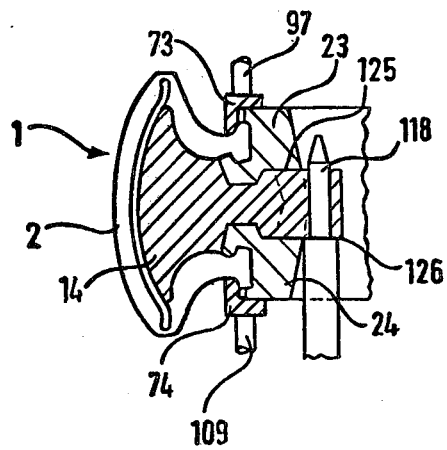
FIG. 11 represents diagrammatically in section the core with the tire supported by the slides.

In a further step, the handles 82 (FIG. 7), associated with the upper rods, are rotated in such a way as to remove the teeth 80 inserted in the grooves 60 of the lower annular element and to insert the other teeth 79 in the grooves 59 of the upper annular element, as shown in FIG. 10.

Also the lower rods 72 rotate simultaneously with the upper rods 71, by virtue of the association between the points 71' and 72', and therefore the teeth 83 of the lower rods are brought into engagement with the grooves 61 of the lower annular element.

In a further step, which can precede or follow the rotation of the rods, fluid pressure is applied in the second lower cylinder 104 in such a way that the relative piston 108 slides upwardly, and, with it, the fifth beam 107, the columns 109, 110 and the lower sleeve 74.

The displacement of the piston 108 is stopped when the end of the sleeve 74 is into contact with the zone of the lower sidewall of the tire in proximity of the bead (FIG. 10).

After the above operations, the core, through the slide, is blocked (FIG. 11) above the extreme handling plane 65, each annular element is associated in an independent manner to the upper and the lower rods (FIG. 10), and the radially outermost surface of the tire beads is blocked by the sleeves (FIG. 10, 11).

In a further operating step (FIGS. 6, 10), fluid pressure is applied simultaneously in the first upper cylinder 87 and in the third lower cylinder 102 in such a way that the relative pistons 90, 105 move along the direction of the core axis, at a certain distance from each other. During the movement of the first upper piston, the first upper beam 91 moves upwardly, and consequently it drags, through the two cylindrical columns 94, 95 slidable in the cylindrical bushings 99, 100, the support 75 fast with the upper annular element 23.

The upward movement of the first upper beam 91 is transmitted, in the same direction and at the same speed, to the second upper cylinder 89 and to the relative piston 93 and, with it, to the second upper beam 92, the columns 96, 97 slidable in the bushings 98, 101, and then the upper sleeve 73 (FIGS. 6, 7, 12).

Analogously, during the movement of the third lower piston 105, the lower beams 106, 107 move downwardly, by dragging with them, through the lower rods 72 and the columns 109, 110, slidable in the bushings 111, 112 of the extreme plane 65, both the lower annular element 24 and the lower sleeve 74.

The displacement of the first and third piston 90 and 105 is stopped with each of the annular elements (FIG. 12) is at such a distance from the handling plane 65 that the tire sidewalls are so spread out that the sectors do not find obstacles to their radial collapse.

The preceding phase for spreading out the sidewalls is followed by the phase in which the core sectors are released to collapse them radially.

During this step, it is acted simultaneously on the fluid of the four oleo-dynamic cylinders 120 (FIG. 9), whose pistons are connected to the four slides of the "key" sectors 15, 16, 17, 18 (FIGS. 5, 8, 9, 12).

The fluid is admitted in the cylinders in such a way that the pistons push the slides 117 towards the center of the core, as far as each of the radially innermost parts 126 of the prolongation members of the sectors is situated above at least a part of the thrust surface 124 and above two of the four radial extensions 138, 139, 140, 141. This arrangement is clearly visible in FIG. 8 and is represented, for the sake of simplicity, only for the "key" sectors 16, 17. Subsequently, it is acted on the fluid of the cylinder 122 in such a way that the relative piston moves upward, pushing with the thrust surface 124 and with the radial extensions all the "key" sectors along the small shafts 118 of the slides (FIG. 13).

The displacement of the piston 123 is stopped as soon as the radially outermost point of the "key" sectors (F in FIG. 13) is situated inside the upper annular element 23.

At this moment, it is acted simultaneously on the fluid of the cylinders 120 associated with the slides 117 still in rest position (FIG. 12), so that the corresponding sectors, namely 19, 20, 21, 22, are radially displaced until collapsed (FIG. 13), as far as this is allowed by their size, in the space left free by the "key" sectors. This condition of the core is represented in FIG. 13, with respect to sector 22.

Figure 14:
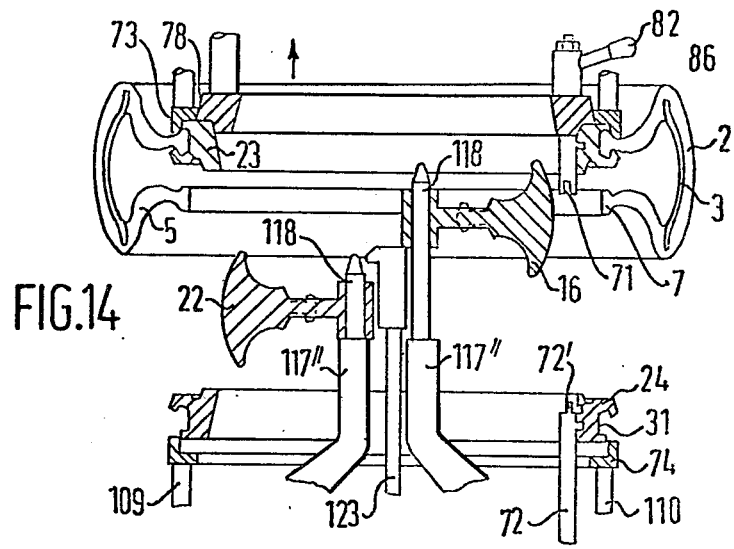
FIG. 14 represents the apparatus when the lower bead of the tire is released.

After the phase of radial collapse of all the sectors, the further steps for the disengagement of the tire are carried out. More precisely, at first the fluid of the first upper cylinder 87 (FIG. 6) is acted upon in such a way that the relative piston 90 moves upwardly, lifting the annular support, and then drags upwards the upper annular element. At the same time fluid pressure is applied in the fourth lower cylinder 104 in such a way that the relative piston 108 moves downwardly, together with the lower sleeve 74 (FIGS. 6, 14).

In consequence of the displacement of the sleeve 74, the lower bead is no longer compelled in the seat 31 of the lower annular element 24 and, owing to the elasticity accumulated during the spreading out of the sidewalls, comes out automatically from the seat.

Subsequently, the upper annular element 23 is again moved upwardly, and at the same time the fluid pressure is applied in the second upper cylinder 89 in such a manner that (see FIGS. 6, 15) the piston 93 is displaced upwardly, together with the upper sleeve 73.

In addition to the movement of the second upper piston 93 with respect to its own cylinder, which in its turn is dragged upwardly by the movement of the first upper piston 90, the lateral surface 86 of the sleeve flange slides on the frusto-conical surface 78 of the support, releasing the second bead of the tire from its blocking in the seat 30 of the upper annular element 23.

Figure 15:
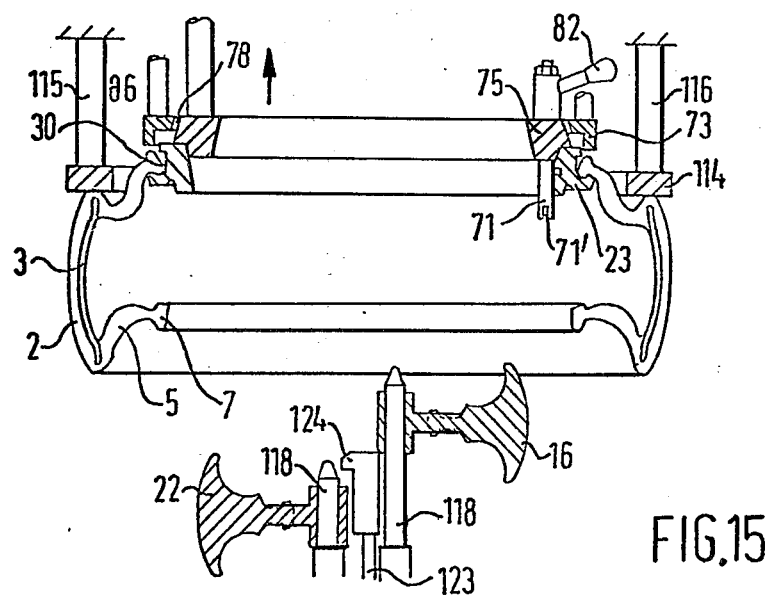
FIG. 15 represents the apparatus when the tire is being removed from the upper annular element.

The displacement of the upper piston 90 continues in the same sense as far as the tire, now simply leaning on the upper annular element 23, is released from it, receiving, in the impact originated between the tread 2 and the fixed ring 114, a force contrary to its motion (FIG. 15). At the end of the above described step, the tire falls by gravity downwardly and can be removed from the space between the upper annular element 23 and the core sectors.

As an alternative to the above, the tire can be collected below the upper annular element 23 after having moved on the rail 66 the upper frame 63 to a zone far from the core sectors.

After having completed the description of the apparatus for the removal of the tire, description will now be made of the steps concerning the preparation of the mold for the manufacture of a new tire, starting from the above described final step, namely with the annular elements 23 and 24 spaced apart from each other and the sectors in completely collapsed condition (FIG. 14).

The preparation of the mold is carried out substantially in accordance with the following procedure:

At first the fluid of the four cylinders 152 (FIGS. 6, 8, 9) is acted upon in such a way that the relative pistons 153 are displaced in radial direction towards the center and the segments 142, 143, 144, 145 originate with their relative flanges 146, 147, 148, 149 a circular surface corresponding to the annular reinforcing structure and suitable to receive it. Then the position of the segments on the slabs 154 is so adjusted that the annular structure arranged on the flanges 146 has its middle line aligned with the equatorial plane. Subsequently, the sectors are acted upon in such a way as to bring them from the collapsed position (see FIG. 14) to the expanded position, in close adherence with the annular structure 3. The displacements and the actuations are substantially as described above, with the exception that they are carried out in the reverse sense, namely, at first sectors 19, 20, 21, 22 and then the "key" sectors 15, 16, 17, 18 are expanded. When the sectors have been totally expanded, the annular structure is supported by the radial pressure exerted by the sectors, and the segments can be moved away by acting on the pistons 153 of the cylinders 152. In a further step, the annular elements are approached on the sectors in order to fully reassemble the inner body of the mold. This step is carried out by admitting fluid in the first and the third cylinders 87, 102 (FIG. 6) so as to approach mutually the relative positions and consequently to drag the annular elements towards the core (FIG. 7).

The movement of the pistons is stopped when the annular elements are associated with the core.

In the successive operating steps, the procedure explained above is followed, namely, at first the teeth 80 of the upper rods 71 are inserted in the grooves 60 of the lower annular element 24, and then the inner body of the mold is lifted and is moved into the envelope for the molding of the new tire.

The above described apparatus has the advantage of allowing a radial collapse of the core to such an extent that it will not hinder in any way the removal of the already formed tire.

Figure 16:
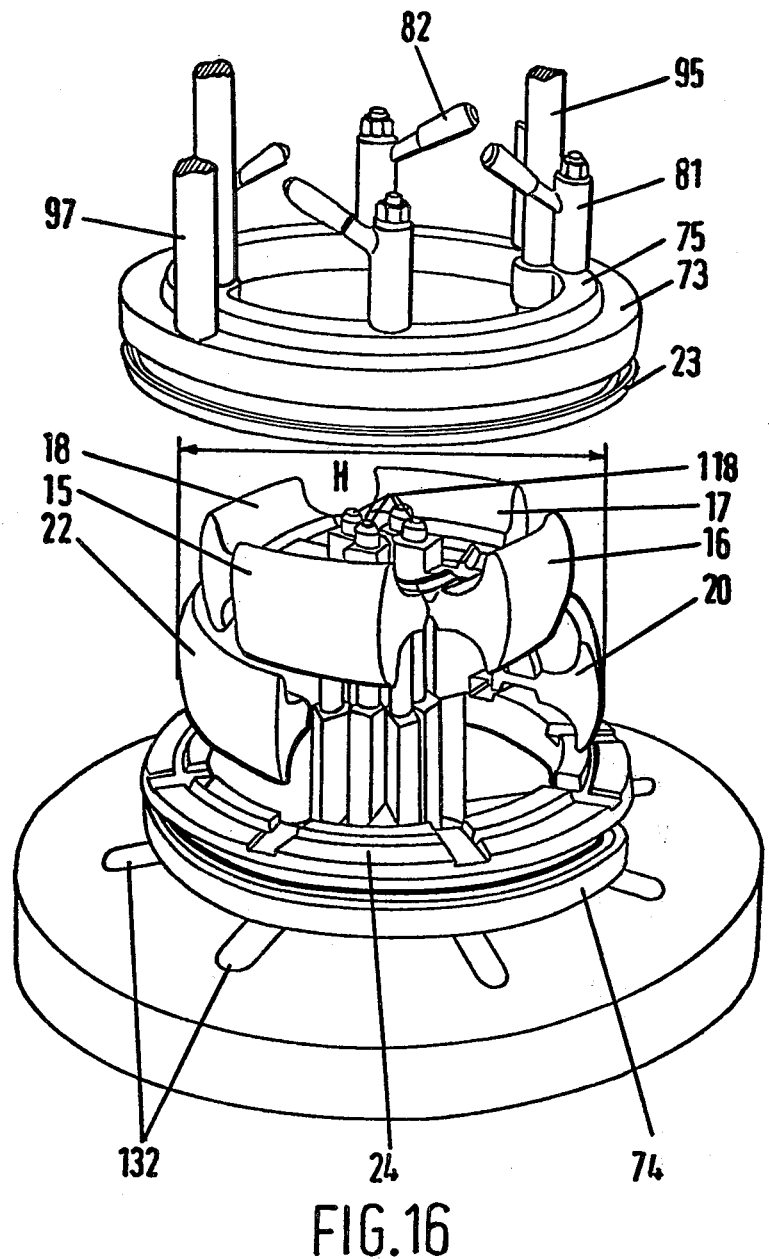
FIG. 16 is a partial perspective view of the maximum collapse of the sectors of the apparatus.

In fact, as shown in FIG. 16, the "key" sectors are displaced along the axis of the core as far as such a distance from the equatorial plane as to allow the maximum possible collapse of the remaining sectors.

Therefore, by virtue of the degree of collapse reached by the sectors, it is extremely easy in the successive steps to drag the tire upwardly without encountering obstacles to the movement (FIG. 14).

By way of example, it is indicated that the apparatus has proved particularly advantageous for tires (FIG. 1) having the following characteristics:

section height I = from 95 to 110 mm
section axial distance M between the beads inside the tire = from 20 to 40 mm
tread width R = from 140 to 180 mm
minimum section axial distance T between the sidewalls = from 30 to 45 mm.

In this case, considering the outer diameter De of the core (FIG. 5) to be 100 measured on the equatorial plane of the mold, the maximum radial collapse of the sectors 19, 20, 21, 22, has given a value H of the maximum overall size between two symmetrical points, in the equatorial plane of the mold, which corresponds to 0.73 De (see FIG. 16).

As regards the above cited values, it has been noted that the tire bead, already released from the lower annular element, is dragged upwardly by the upper annular element without striking or simply rubbing on the radially outermost surface of the sectors 19, 20, 21, 22, already in collapsed position.

It can be understood easily that the result proves advantageous in view of obtaining tires devoid of inadmissible deformations of the sidewalls and of the beads.

The apparatus according to the invention affords moreover the advantage of being associatable with the inner body of the mold in a very short time, of the order of a few seconds, and with utmost precision.

The result is achieved by providing an annular support whose surfaces 77, 78 (FIG. 7) are particularly able to facilitate in a short time interval the centering of the upper frame with respect to the core, and therefore they expedite the engagement between the teeth of the upper rods and the grooves of the lower annular element.

Moreover, the apparatus is suitable for rapid disassembly of the mold core.

In fact, by synchronizing the movements of the pistons 121, the slides associated with the sectors first permit, along the relative radial guides, the four "key" sectors 15, 16, 17, 18 to shift radially along the radial guides at the same time, and then, still at the same time, permit the remaining four sectors 19, 20, 21, 22 to shift.

A still further advantage of the apparatus is that of permitting a uniform distribution, on each annular element, of the forces necessary for spreading out the sidewalls. In fact, for a tire like that illustrated in FIG. 1, it has been found that the thrust to be exerted on each annular element is of the order of 2,000 kg; for said value, the selection of the four upper and lower rods and their symmetrical position as described has proved the best for the correct spreading out of the sidewalls.

The most evident advantage of the apparatus according to the invention is that of obtaining in an almost automatic manner the handling of the mold, with the possibility of reducing considerably the expenses encountered in the manufacture of pneumatic tires obtained with molding processes employing an inner rigid body.

Moreover, it is understood that the above reported examples are not a limiting character and that the scope of protection of the invention includes any alternative embodiment deriving from the above indicated inventive concept which is not excluded by the claims.

Although the invention is described in detail for the purpose of illustration, it is to be understood that such detail is solely for that purpose and that variations can be made therein by those skilled in the art without departing from the spirit and scope of the invention except as it may be limited by the claims.

I claim:

1. An apparatus for assembling and disassembling a mold for molding a vehicle tire, said mold comprising an outer envelope and an inner body associated to form a mold cavity of the desired shape of the tire, said inner body comprising a core of radially displaceable sectors and upper and lower annular elements which are separable from one another and from the core along the direction of the core axis, said elements having at least two surfaces which correspond to the tire surfaces disposed between the inner zone connecting the sidewalls to the beads and a part of the axially outer zone of the beads, said assembling and disassembling apparatus comprising an upper frame and a fixed lower frame provided with a horizontal mold assembling plane, said frames having central vertical axes aligned with each other to constitute a central vertical axis of the assembly apparatus, first means associated with said frames for applying forces to the annular elements of the inner body of the mold to vary their distance along the direction of the core axis, the first means associated to the upper frame supporting the inner body of the mold, said assembly apparatus comprising second means associated with the lower frame to support and block the sectors of the mold core on said assembling plane, to displace said sectors radially, and to displace at least a part of the sectors along the direction of the core axis from said assembling plane to allow maximum radial collapse of the remaining sectors.

2. An apparatus as in claim 1, characterized in that said upper frame is horizontally displaceable.

3. An apparatus as in claim 1, characterized in that said first means comprise upper and lower cylindrical rods, which engage the annular elements, the rods associated to the upper frame being provided with a first and a second tooth, arranged in two differently oriented planes passing through the rod axis, said first tooth being provided for engaging in a groove of the upper annular element, said second tooth being provided for engaging in a first groove of the lower annular element, the rods associated with the lower frame being provided with a tooth provided for engaging in a second groove of the lower annular element, the apparatus further comprising two sleeves, each having an inner diameter equal to the radially outermost diameter of the tire beads protruding from the inner body of the mold, said sleeves, respectively associated to the upper and to the lower frame, being arranged coaxial to the two annular elements, with one end into contact with the tire sidewalls in proximity of the beads, when the inner body of the mold with the tire is associated with the apparatus.

4. An apparatus as in claim 3, characterized in that it comprises, together with the upper cylindrical rods and the lower cylindrical rods, a support of annular shape and a control apparatus associated with the lower and the upper frame to approach or detach mutually the rods along the direction of the central vertical axis of the apparatus and to detach the sleeves, arranged with one end in contact with the tire sidewalls, from the inner body of the mold, said support having at least an external lateral surface of such a shape as to be able to fit exactly inside the upper annular element as far as a depth not concerning the opening of the grooves of said upper annular element and at least a surface in the form of a circular ring to provide an abutting surface with respect to the surface of the upper annular element which is the farthest from the equatorial plane of the mold, said support being connected with the control apparatus associated to the upper frame and being arranged coaxial to the central vertical axis of the apparatus, said upper rods being inserted, for a portion of their length, in the thickness of the annular support in a direction parallel to the central vertical axis of the apparatus, free to rotate about their own axis and protruding with their teeth below the support, said lower rods being connected at one end with the control apparatus associated to the lower frame, free to rotate about their own axis, inserted for a portion of their length in the thickness of the handling plane along a direction parallel to the central vertical axis of the apparatus, and protruding with their teeth above the handling plane, the upper and the lower rods being aligned with one another and being arranged in a symmetrical position with respect to the central vertical axis of the apparatus, said lower rods being provided with a point having the form of a prismatic geometric solid, and said upper rods being provided with a point having a notch of a form corresponding to that of said solid in order to ensure a coupling between the upper and the lower rods, as well as a rotation common about their own axis, one sleeve being connected to the control apparatus associated to the upper frame and the other to that associated to the lower frame.

5. An apparatus as in claim 4, characterized in that said control apparatus operates four upper cylindrical rods, four lower cylindrical rods and the sleeves, said upper and lower rods being aligned with respect to one another and being arranged on two perpendicular planes passing through the central vertical axis of the apparatus, said control apparatus comprising a first and a second elementary apparatus respectively associated to the upper and the lower frame, said first elementary apparatus associated to the upper frame comprising a first and a second fluodynamic cylinder having respectively a first and a second piston, an upper plate, a first and a second beam, four cylindrical columns, four cylindrical bushings, said upper plate being arranged horizontally, said first cylinder being situated below said upper plate, with its axis aligned with the central vertical axis of the apparatus, said first piston protruding above said upper plate, said first beam being arranged above said first piston, said second cylinder being situated above said first beam, with its axis aligned with that of the first cylinder, said second beam being situated above said second piston, said four bushings being obtained in the thickness of the upper plate, with axes symmetrical two by two with respect to the central vertical axis of the apparatus, said columns being displaceable in said bushings, two columns being connected between the ends of the first beam and the annular support and the other two columns, farther from the central vertical axis, being connected between the ends of the second beam and the upper sleeve, said second elementary apparatus associated to the lower frame comprising a third and a fourth fluo-dynamic cylinder having respectively a third and a fourth piston, a lower plate, a third, a fourth and a fifth beam, two cylindrical columns, said lower plate being situated horizontally below said handling plane, said third cylinder being arranged below said lower plate, with its axis aligned with the central vertical axis of the apparatus, said third piston protruding above said lower plate, said third and fourth beam being arranged at 90° with respect to each other and above the third piston, said fourth cylinder being situated above said third and fourth beam, with its axis aligned with that of the third cylinder, said fifth beam being arranged above said fourth piston, said columns being positioned symmetrically with respect to the central vertical axis of the apparatus and being displaceable through the thickness of the handling plane, and connected between the ends of said fifth beam and the lower sleeve situated above the handling plane, each end of said third and fourth beam being associated to a lower cylindrical rod in such a way that said lower rods can rotate about their own axis.

6. An apparatus as in claim 5, characterized in that said annular support comprises an outer lateral frusto-conical surface, whose greater base is defined by the radially outermost circumference of the circle ring shaped surface of the annular support, and said upper sleeve comprises, at its end opposite to the end in contact with the tire, a circular flange whose inner lateral surface is exactly corresponding to said outer lateral frusto-conical surface of the support and is in contact around it.

7. An apparatus as in claim 6, characterized in that it comprises means for applying a force to the tire in a direction opposite to the upward movement of the upper annular element to disengage the tire.

8. An apparatus as in claim 7, characterized in that said means for applying a force on the tire comprise a fixed ring connected to the upper frame, coaxial to the central vertical axis of the apparatus and having an inner diameter greater than the maximum distance between the columns, said ring determining an abutting surface for disengaging the tire from the upper annular element.

9. An apparatus as in claim 1, characterized in that said second means comprise slides, guides for the slides, connections between the slides and the sectors of the mold core to associate said slides with said sectors when the inner body of the mold is above the handling plane, said slides being in a number equal to that of the sectors, said guides being arranged radially about the central vertical axis of the apparatus and on a plane parallel to the handling plane, and an actuation mechanism for displacing radially the slides with the sectors, said mechanism comprising moreover engaging means for displacing at least a part of said sectors in the direction of the core axis as far as a distance from the handling plane which permits the maximum radial collapse of the remaining sectors of the mold.

10. An apparatus as in claim 9, characterized in that said connections join the slides with appropriate radial prolongation members of the sectors.

11. An apparatus as in claim 10, characterized in that the radially innermost part of the prolongation members of the sectors protrudes from the slides.

12. An apparatus as in claim 10, characterized in that said connections comprise a cylindrical small shaft connected to each slide, a through hole in each prolongation of the sectors, said hole having a diameter corresponding to the diameter of the small shaft, said small shafts extending in a direction parallel to the core axis and above the handling plane, and said small shafts being insertable in said holes of the prolongations when the inner body of the mold is above the handling plane.

13. An apparatus as in claim 9, characterized in that said engaging means comprise a thrust surface arranged at the center of the apparatus in a plane below the radial prolongation members of the sectors, said thrust surface, when the slides associated to the sectors to be displaced along the direction of the core axis are collapsed at the center of the apparatus, being able to abut against the lower surface of the radially innermost parts of the prolongation members which protrude from the slides in order to displace the corresponding sectors along the small shafts.

14. An apparatus as in claim 9, characterized in that the guides of the slides are arranged below the handling plane and the slides run in appropriate radial grooves of said handling plane when the slides, with the sectors, are displaced radially.

15. An apparatus as in claim 9, characterized in that said actuation mechanism comprises a fluo-dynamic cylinder with a piston associated with each slide, and a single fluo-dynamic cylinder with a piston associated to said engaging means, said cylinders being situated below the guides and said single cylinder being arranged at the center of the apparatus, with its own axis aligned with the central axis of the apparatus.

16. An apparatus as in claim 1, characterized in that it comprises furthr means able to apply the annular reinforcing structure of a tire about the inner body of the mold.

17. An apparatus as in claim 16, characterized in that said further means comprise circular segments and a pneumatic control for each segment, each segment comprising a circular flange parallel to the handling plane and able to support said annular reinforcing structure, said pneumatic control comprising a cylinder with the relative piston, said cylinder being applied above the handling plane with its axis parallel to said plane and the relative piston slidable inside the cylinder in radial direction, said piston being connected to a segment.

* * * * *